(12) United States Patent
Ikeda et al.

(10) Patent No.: US 7,369,880 B2
(45) Date of Patent: May 6, 2008

(54) MOBILE PHONE APPARATUS

(75) Inventors: Yutaka Ikeda, Kanagawa (JP); Emi Satou, Kanagawa (JP)

(73) Assignee: Matsushita Electric Industrial Co., Ltd, Kadoma-Shi (JP)

( * ) Notice: Subject to any disclaimer, the term of this patent is extended or adjusted under 35 U.S.C. 154(b) by 207 days.

(21) Appl. No.: 10/574,668

(22) PCT Filed: Mar. 31, 2005

(86) PCT No.: PCT/JP2005/006280

§ 371 (c)(1),
(2), (4) Date: Apr. 4, 2006

(87) PCT Pub. No.: WO2005/099236

PCT Pub. Date: Oct. 20, 2005

(65) Prior Publication Data

US 2007/0082712 A1    Apr. 12, 2007

(30) Foreign Application Priority Data

Apr. 5, 2004  (JP) .............................. 2004-110903

(51) Int. Cl.
*H04M 1/00*  (2006.01)
(52) U.S. Cl. ...................................... 455/567; 340/7.58
(58) Field of Classification Search ................ 455/567, 455/518, 519; 340/7.58, 7.59, 7.6, 7.62
See application file for complete search history.

(56) References Cited

U.S. PATENT DOCUMENTS 6,385,461 B1 * 5/2002 Raith ......................... 455/518

FOREIGN PATENT DOCUMENTS

| JP | 9-51374 | 2/1997 |
|---|---|---|
| JP | 2000-295661 | 10/2000 |

* cited by examiner

*Primary Examiner*—Lee Nguyen
(74) *Attorney, Agent, or Firm*—Kratz, Quintos & Hanson, LLP.

(57) ABSTRACT

A mobile phone apparatus is provided which can register the settings for a ringing operation when receiving a telephone call depending on the situation. The mobile phone apparatus includes: a communication unit 1 which carries out transmission and receipt of data via a communication network; an output unit 2 for outputting at least one of sound, vibration, light and indication; a storage unit 10 which stores apparatus identification data such as a telephone number for the mobile phone apparatus and various setting information, the storage unit 10 including: an individual information registering unit 11 which registers apparatus identification information on a plurality of other communication apparatuses and individual identification information such as an owner name or user name of each of the plurality of communication apparatuses; a group registering unit 12 which registers some of the plurality of other communication apparatuses registered in the individual information registering unit 11 as a group; and an operation setting unit 20 which sets operation contents of the output unit 2; an input unit 3 for inputting apparatus identification data and/or various setting information; and a display unit 4 for displaying information on transmission and receipt of data and/or various setting information. In this case, the output unit 2 outputs the operation contents set by the operation setting unit 20 when an incoming call signal is received by the communication unit 1.

19 Claims, 4 Drawing Sheets

MOBILE PHONE APPARATUS

TECHNICAL FIELD

The present invention relates to a mobile phone apparatus in which any type of output operation such as sound, vibration, light and indication can be set in response to usage conditions of a user thereof.

BACKGROUND ART (TECHNIQUE)

Heretofore, the function of a manner mode capable of setting a mobile phone apparatus so that a ringtone or vibration thereof cannot be generated is provided in the mobile phone apparatus. The function of the manner mode allows the mobile phone apparatus to stop the function of singing (or ringing) in a lump sum in accordance with usage conditions of a user of the mobile phone apparatus such as during a meeting.

On the other hand, a mobile phone apparatus that can set and change a group or groups to be admitted to receive a telephone call in accordance with usage conditions of a user of the mobile phone apparatus has been proposed (for example, see Patent Document 1). Such a mobile phone apparatus can change settings of incoming calls separately from each of groups in accordance with the usage conditions of the user of the mobile phone apparatus.

Patent Document 1: Japanese Laid-open Patent Application No. 2000-295661

However, only settings of presence or absence of a ringtone and/or vibration can be set in the function of the manner mode, and the function is no relation to a telephone directory of the mobile phone apparatus. Therefore, the mobile phone apparatus can set only whether or not to sing when receiving a telephone call in spite of a person from whom the mobile phone apparatus receives a telephone call.

Further, in the settings of incoming call for separate groups as Patent Document 1, although singing for each of the groups can be set, the user of the mobile phone apparatus must change the settings with respect to each of the groups separately. In Patent Document 1, by adding a weighted numerical value to each of the groups, the mobile phone apparatus can sing only the groups to each of which a weighted numerical value higher than a numerical value of settings for incoming call is added. However, in the case where persons or groups from each of whom the user wants to receive a telephone call are changed in response to the usage conditions of the user, it is required to change the settings of a plurality of individuals or groups in each case, and it is impossible to change the settings depending on the situation by a simple operation.

DISCLOSURE OF THE INVENTION

It is therefore one object of the present invention to provide a mobile phone apparatus which can register the settings for a ringing operation when receiving a telephone call depending on the situation.

A mobile phone apparatus of a first present invention includes:
a communication unit which carries out transmission and receipt of data via a communication network;
an output unit for outputting at least one of sound, vibration, light and indication;
a storage unit which stores apparatus identification data such as a telephone number for the mobile phone apparatus and various setting information, the storage unit including:

an individual information registering unit which registers apparatus identification information on a plurality of other communication apparatuses and individual identification information such as an owner name or user name of each of the plurality of communication apparatuses;

a group registering unit which registers some of the plurality of other communication apparatuses registered in the individual information registering unit as a group; and an operation setting unit which sets operation contents of the output unit;
an input unit for inputting apparatus identification data and/or various setting information; and
a display unit for displaying information on transmission and receipt of data and/or various setting information.

In this case, the output unit outputs the operation contents set by the operation setting unit when an incoming call signal is received by the communication unit. Further, the storage unit further includes a situation mode setting unit which sets the operation contents of the output unit in response to usage conditions of the user of the mobile phone apparatus, and the situation mode setting unit includes a situation mode selecting unit which selects any situation mode from a plurality of situation modes and a situation operation setting unit which sets the operation contents of the output unit in the situation mode selected by the situation mode selecting unit. Moreover, the situation operation setting unit includes a separate group operation setting unit which specifies group information registered by the group registering unit and sets the operation contents of the output unit to the specified group information, and an individual operation setting unit which specifies individual identification information registered by the individual information registering unit and sets the operation contents of the output unit to the specified individual identification information.

The mobile phone apparatus of a second present invention is characterized that, in the mobile phone apparatus of the first present invention, the situation mode setting unit includes:
a situation mode adding/deleting unit which can register or delete a new situation mode; and
a situation mode name changing unit which can change identification information of the situation mode that has already been registered.

The mobile phone apparatus of a third present invention is characterized that, in the mobile phone apparatus of the first present invention, the situation mode selecting unit can select an off mode in which any situation mode is not carried out. In this case, the operation setting unit includes: a separate registration operation setting unit which sets the operation contents of the output unit with respect to each of the registered individual identification information or the registered group information, and mode selecting unit which does not fulfill the separate registration operation setting unit in the case where any situation mode is selected by the situation mode selecting unit and fulfills the separate registration operation setting unit in the case where the off mode is selected by the situation mode selecting unit. Further, the situation operation setting unit has a function of capable of setting operation contents of the output unit different from the operation contents set in the separate registration operation setting unit by situation mode.

The mobile phone apparatus of a fourth present invention is characterized that, in the mobile phone apparatus of the first present invention, the situation operation setting unit has a function of capable of setting the operation contents of the output unit by situation mode.

The mobile phone apparatus of a fifth present invention is characterized that, in the mobile phone apparatus of the second present invention, the situation operation setting unit includes a situation copying unit which can copy the situation mode information that has already been registered as it is, and that the situation mode setting unit has a function of capable of registering a new situation mode by means of the situation copying unit when the situation mode adding/deleting unit adds the new situation mode, and of capable of changing the settings of the situation mode information copied by the situation copying unit by means of the separate group operation setting unit and the individual operation setting unit.

The mobile phone apparatus of a sixth present invention is characterized that, in the mobile phone apparatus of the first present invention, each of the separate group operation setting unit and the individual operation setting unit is set to either operation or nonoperation of the output unit.

The mobile phone apparatus of a seventh present invention is characterized that, in the mobile phone apparatus of the first present invention, the situation operation setting unit includes an unregistered batch operation setting unit which sets groups or individuals that has been unregistered in the situation mode as unregistered information and sets the operation contents of the output unit with respect to the unregistered information.

The mobile phone apparatus of an eighth present invention is characterized that, in the mobile phone apparatus of the first present invention, the situation operation setting unit includes a separate output operation setting unit which specifies the operation contents of the output unit and sets group information or individual identification information to the operation contents of the output unit in place of the separate group operation setting unit and the individual operation setting unit.

The mobile phone apparatus of a ninth present invention is characterized that, in the mobile phone apparatus of the first present invention, the situation mode setting unit sets the operation contents of the output unit with respect to the groups or individuals registered in the situation mode to nonoperation.

The mobile phone apparatus of a tenth present invention is characterized that, in the mobile phone apparatus of the first present invention, in the situation mode selected by the situation mode selecting unit, the situation mode setting unit can specify either group specification set by the separate group operation setting unit or individual specification set by the individual operation setting unit, and alternatively, the situation mode setting unit can specify both the group specification set by the separate group operation setting unit and the individual specification set by the individual operation setting unit.

The mobile phone apparatus of an eleventh present invention is characterized that, in the mobile phone apparatus of the tenth present invention, in the case where the situation mode setting unit specifies both the group specification set by the separate group operation setting unit and the individual specification set by the individual operation setting unit, and the individual identification information in the group specification overlaps the individual identification information in the individual specification, then the operation contents of the output unit set by the individual operation setting unit is prioritized over the operation contents of the output unit set by the separate group operation setting unit.

The mobile phone apparatus of a twelfth present invention is characterized that, in the mobile phone apparatus of the first present invention, the operation setting unit includes a manner mode setting unit which can set specific operation contents of the output unit to nonoperation, and the storage unit includes a mode selecting unit which selects either the situation mode setting unit or the manner mode setting unit.

The mobile phone apparatus of a thirteenth present invention is characterized that, in the mobile phone apparatus of the first present invention, the input unit has a plurality of keys including specific keys, and the situation mode is selected by means of an operation of the specific keys.

The mobile phone apparatus of a fourteenth present invention is characterized that, in the mobile phone apparatus of the first present invention, the input unit has a plurality of keys including specific keys and a dedicated key for selecting the situation mode, and the situation mode is selected by means of an operation of the specific keys and an operation of the dedicated key.

The mobile phone apparatus of a fifteenth present invention is characterized that, in the mobile phone apparatus of the first present invention, the mobile phone apparatus further includes: a situation mode information receiving unit for receiving a mode instruction signal from an outside situation mode sending unit wherein the situation mode setting unit includes a situation mode switching unit which switches the situation mode of the mobile phone apparatus on the basis of the mode instruction signal received by the situation mode information receiving unit.

The mobile phone apparatus of a sixteenth present invention is characterized that, in the mobile phone apparatus of the first present invention, the storage unit includes a schedule setting unit which fulfills the set situation mode at the date and time that has been set in advance.

The mobile phone apparatus of a seventeenth present invention is characterized that, in the mobile phone apparatus of the fifteenth or sixteenth present invention, the mobile phone apparatus further includes a switching content output unit for outputting at least one of sound, vibration, light and indication when the situation mode is switched.

The mobile phone apparatus of an eighteenth present invention is characterized that, in the mobile phone apparatus of the first present invention, the storage unit stores contents to be displayed on the display unit in accordance with each of the situation modes, and the display unit displays the contents to be displayed in accordance with the situation mode selected by the situation mode selecting unit.

EFFECT OF THE INVENTION

According to the present invention, it is possible to carry out an incoming call operation for each of group information and/or individual information in response to usage conditions of the user such as "on duty" and "play (game)".

DESCRIPTION OF REFERENCE NUMBER

Figure 1:
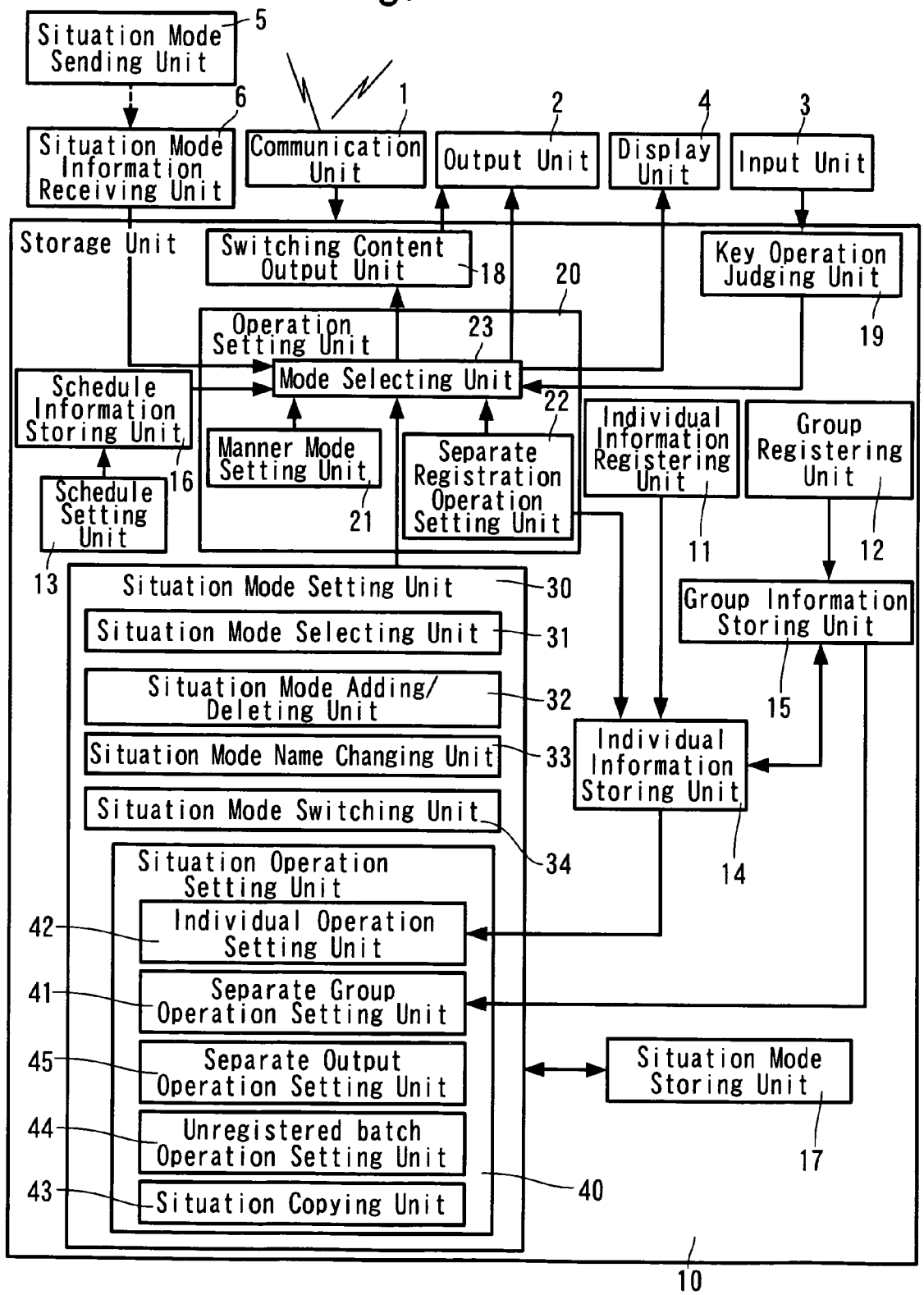
FIG. 1 is a block diagram which shows the configuration of a mobile phone apparatus as means for achieving functions thereof in one example of the present invention.

1 Communication Unit
2 Output Unit
3 Input Unit
4 Display Unit
5 Situation Mode Sending Unit
6 Situation Mode Information Receiving Unit
10 Storage Unit
11 Individual Information Registering Unit
12 Group Registering Unit
13 Schedule Setting Unit
18 Switching Content Output Unit
19 Key Operation Judging Unit
20 Operation Setting Unit
21 Manner Mode Setting Unit
22 Separate Registration Operation Setting Unit
23 Mode Selecting Unit
30 Situation Mode Setting Unit
31 Situation Mode Selecting Unit
32 Situation Mode Adding/Deleting Unit
33 Situation Mode Name Changing Unit
40 Situation Operation Setting Unit
41 Separate Group Operation Setting Unit
42 Individual Operation Setting Unit
43 Situation Copying Unit
44 Unregistered batch Operation Setting Unit
45 Separate Output Operation Setting Unit

BEST MODE FOR CARRYING OUT THE INVENTION

A mobile phone apparatus of a first embodiment of the present invention is provided with a storage unit including: an individual information registering unit which registers apparatus identification information on a plurality of other communication apparatuses and individual identification information such as an owner name or user name of each of the plurality of communication apparatuses; a group registering unit which registers some of the plurality of other communication apparatuses registered in the individual information registering unit as a group; and an operation setting unit which sets operation contents of the output unit. In this case, the output unit outputs the operation contents set by the operation setting unit when an incoming call signal is received by the communication unit. Further, the storage unit further includes a situation mode setting unit which sets the operation contents of the output unit in response to usage conditions of the user of the mobile phone apparatus, and the situation mode setting unit includes a situation mode selecting unit which selects any situation mode from a plurality of situation modes and a situation operation setting unit which sets the operation contents of the output unit in the situation mode selected by the situation mode selecting unit. Moreover, the situation operation setting unit includes a separate group operation setting unit which specifies group information registered by the group registering unit and sets the operation contents of the output unit to the specified group information, and an individual operation setting unit which specifies individual identification information registered by the individual information registering unit and sets the operation contents of the output unit to the specified individual identification information. According to the present embodiment, it is possible to register the settings for ringing operation when receiving a telephone call depending on the situation, and this makes it possible to carry out an incoming call operation for each of group information and/or individual information in response to usage conditions of the user.

The mobile phone apparatus of a second embodiment of the present invention is characterized that, in the mobile phone apparatus of the first embodiment, the situation mode setting unit includes: a situation mode adding/deleting unit which can register or delete a new situation mode; and a situation mode name changing unit which can change identification information of the situation mode that has already been registered. According to the present embodiment, it is possible to add a new situation mode and to change the name of settings arbitrarily.

The mobile phone apparatus of a third embodiment of the present invention is characterized that, in the mobile phone apparatus of the first embodiment, the situation mode selecting unit can select an off mode in which any situation mode is not carried out. In this case, the operation setting unit includes: a separate registration operation setting unit which sets the operation contents of the output unit with respect to each of the registered individual identification information or the registered group information, and a mode selecting unit which does not fulfill the separate registration operation setting unit in the case where any situation mode is selected by the situation mode selecting unit and fulfills the separate registration operation setting unit in the case where the off mode is selected by the situation mode selecting unit. Further, the situation operation setting unit has a function of capable of setting operation contents of the output unit different from the operation contents set in the separate registration operation setting unit by situation mode. According to the present embodiment, it is possible to set ringtones depending on the situation in addition to the ringtones set for each of the individuals and the groups. In the case where the operation contents of the output unit is not set to any situation mode, it is possible to ring the ringtones set for each of the individuals and the groups, for example.

The mobile phone apparatus of a fourth embodiment of the present invention is characterized that, in the mobile phone apparatus of the first embodiment, the situation operation setting unit has a function of capable of setting the operation contents of the output unit by situation mode. According to the present embodiment, it is possible to register a plurality of operation settings when receiving a telephone call in response to each of the situations.

The mobile phone apparatus of a fifth embodiment of the present invention is characterized that, in the mobile phone apparatus of the second embodiment, the situation operation setting unit includes a situation copying unit which can copy the situation mode information that has already been registered as it is, and that the situation mode setting unit has a function of capable of registering a new situation mode by means of the situation copying unit when the situation mode adding/deleting unit adds the new situation mode, and of capable of changing the settings of the situation mode information copied by the situation copying unit by means of the separate group operation setting unit and the individual operation setting unit. According to the present embodiment, since only portions to be changed may be set when registering a plurality of situations whose setting contents are particularly common, it is possible to save setting time and/or trouble for settings.

The mobile phone apparatus of a sixth embodiment of the present invention is characterized that, in the mobile phone apparatus of the first embodiment, each of the separate group operation setting unit and the individual operation setting unit is set to either operation or nonoperation of the output unit. According to the present embodiment, since separate situation setting is selected whether or not the output unit operates in each of groups and functions, it is possible to carry out the settings easily.

The mobile phone apparatus of a seventh embodiment of the present invention is characterized that, in the mobile phone apparatus of the first embodiment, the situation operation setting unit includes an unregistered batch operation setting unit which sets groups or individuals that has been unregistered in the situation mode as unregistered information and sets the operation contents of the output unit with respect to the unregistered information. According to the present embodiment, it is possible to deal with the groups or individuals unregistered in the separate situation setting as other group in a lump sum, and therefore, it is possible to save setting time and/or trouble for settings.

The mobile phone apparatus of an eighth embodiment of the present invention is characterized that, in the mobile phone apparatus of the first embodiment, the situation operation setting unit includes a separate output operation setting unit which specifies the operation contents of the output unit and sets group information or individual identification information to the operation contents of the output unit in place of the separate group operation setting unit and the individual operation setting unit. According to the present embodiment, it is possible to register only groups or individuals for each of whom the user wants to make the mobile phone apparatus operate with respect to each of the functions.

The mobile phone apparatus of a ninth embodiment of the present invention is characterized that, in the mobile phone apparatus of the first embodiment, the situation mode setting unit sets the operation contents of the output unit with respect to the groups or individuals registered in the situation mode to nonoperation. According to the present embodiment, it is possible to register only the groups or individuals for each of whom the user does not want to make the mobile phone apparatus operate with respect to each of the functions.

The mobile phone apparatus of a tenth embodiment of the present invention is characterized that, in the mobile phone apparatus of the first embodiment, in the situation mode selected by the situation mode selecting unit, the situation mode setting unit can specify either group specification set by the separate group operation setting unit or individual specification set by the individual operation setting unit, and alternatively, the situation mode setting unit can specify both the group specification set by the separate group operation setting unit and the individual specification set by the individual operation setting unit. According to the present embodiment, it is possible to set a unit that can be registered in the separate situation setting to either plural at a time or an individual, and this makes it possible to carry out the settings easily.

The mobile phone apparatus of an eleventh embodiment of the present invention is characterized that, in the mobile phone apparatus of the tenth embodiment, in the case where the situation mode setting unit specifies both the group specification set by the separate group operation setting unit and the individual specification set by the individual operation setting unit, and the individual identification information in the group specification overlaps the individual identification information in the individual specification, then the operation contents of the output unit set by the individual operation setting unit is prioritized over the operation contents of the output unit set by the separate group operation setting unit. According to the present embodiment, in the case where the person registered in a group is also registered as an individual, the setting of individual registration is prioritized over the setting of group registration. Therefore, it is possible to easily carry out the settings in which the person registered in a group is excluded from the group exceptionally.

The mobile phone apparatus of a twelfth embodiment of the present invention is characterized that, in the mobile phone apparatus of the first embodiment, the operation setting unit includes a manner mode setting unit which can set specific operation contents of the output unit to nonoperation, and the storage unit includes a mode selecting unit which selects either the situation mode setting unit or the manner mode setting unit. According to the present embodiment, it is possible to use either a conventional manner mode or the situation mode selectively.

The mobile phone apparatus of a thirteenth embodiment of the present invention is characterized that, in the mobile phone apparatus of the first embodiment, the input unit has a plurality of keys including specific keys, and the situation mode is selected by means of an operation of the specific keys. According to the present embodiment, it is possible to select the situation by pushing a specific button (key) by means of a manual operation at arbitrary timing.

The mobile phone apparatus of a fourteenth embodiment of the present invention is characterized that, in the mobile phone apparatus of the first embodiment, the input unit has a plurality of keys including specific keys and a dedicated key for selecting the situation mode, and the situation mode is selected by means of an operation of the specific keys and an operation of the dedicated key. According to the present embodiment, it is possible to select the situation by inputting a situation setting number by means of the keys constituting the input unit and then operating the dedicated key for selecting the situation mode as well as a conventional method for setting the manner mode.

The mobile phone apparatus of a fifteenth embodiment of the present invention is characterized that, in the mobile phone apparatus of the first embodiment, the mobile phone apparatus further includes: a situation mode information receiving unit for receiving a mode instruction signal from an outside situation mode sending unit wherein the situation mode setting unit includes a situation mode switching unit which switches the situation mode of the mobile phone apparatus on the basis of the mode instruction signal received by the situation mode information receiving unit. According to the present embodiment, it is possible to change the settings in response to the situation automatically using a short-range radio communication such as Bluetooth.

The mobile phone apparatus of a sixteenth embodiment of the present invention is characterized that, in the mobile phone apparatus of the first embodiment, the storage unit includes a schedule setting unit which fulfills the set situation mode at the date and time that has been set in advance. According to the present embodiment, it is possible to carry out a configuration change automatically at the day and time that has been set in advance in conjunction with a schedule book, for example.

The mobile phone apparatus of a seventeenth embodiment of the present invention is characterized that, in the mobile phone apparatus of the fifteenth or sixteenth embodiment, the mobile phone apparatus further includes a switching content output unit for outputting at least one of sound, vibration light and indication when the situation mode is switched. According to the present embodiment, it is possible to inform the user that the setting is switched automatically using a specific sound or vibration.

The mobile phone apparatus of an eighteenth embodiment of the present invention is characterized that, in the mobile phone apparatus of the first embodiment, the storage unit stores contents to be displayed on the display unit in accordance with each of the situation modes, and the display unit displays the contents to be displayed in accordance with the situation mode selected by the situation mode selecting unit. According to the present embodiment, by displaying the indication from which the user can understand present situation settings on a liquid crystal screen, it is possible for the user to understand the present settings.

EXAMPLE

A description will be given for a mobile phone apparatus in one example of the present invention.

FIG. 1 is a block diagram which shows the configuration of a mobile phone apparatus as means for achieving functions thereof in one example of the present invention.

The mobile phone apparatus of the present example is provided with: a communication unit 1 which carries out transmission and receipt of data via a communication network; an output unit 2 for outputting at least one of sound, vibration, light and indication; an input unit 3 for inputting apparatus identification data and/or various setting information; a display unit 4 for displaying information on transmission and receipt of data and/or various setting information; a situation mode information receiving unit 6 for receiving a mode instruction signal from an outside situation mode sending unit 5; and a storage unit 10 which stores apparatus identification data such as a telephone number for the mobile phone apparatus and various setting information. In this regard, the situation mode sending unit 5 is a short-range radio communication apparatus such as Bluetooth, and is placed in a specific building such as a hospital and a theater, in a specific space such as a conference room and a bedroom, or in a specific vehicle such as an electric train and an airplane.

The storage unit 10 includes an individual information registering unit 11 which registers apparatus identification information on a plurality of other communication apparatuses and individual identification information such as an owner name or user name of each of the plurality of communication apparatuses, a group registering unit 12 which registers some of the plurality of other communication apparatuses registered in the individual information registering unit 11 as a group, and a schedule setting unit 13 which registers schedules or the like. Further, the storage unit 10 includes an individual information storing unit 14 which stores information registered in the individual information registering unit 11, a group information storing unit 15 which stores information registered in the group registering unit 12, and a schedule information storing unit 16 which stores information registered in the schedule setting unit 13.

Moreover, the storage unit 10 includes an operation setting unit 20 which sets operation contents of the output unit 2, and a situation mode setting unit 30 which sets the operation contents of the output unit 2 in response to usage conditions of the user of the mobile phone apparatus.

The operation setting unit 20 includes a manner mode setting unit 21 which can set specific operation contents of the output unit 2 to nonoperation, a separate registration operation setting unit 22 which sets the operation contents of the output unit 2 with respect to each of the registered individual identification information or the registered group information, and a mode selecting unit 23. When an incoming call signal is received by the communication unit 1, the operation setting unit 20 outputs the operation contents set to the output unit 2. The mode selecting unit 23 selects the settings of either the situation mode setting unit 30 or the manner mode setting unit 21. Therefore, in the case where the manner mode setting unit 21 is selected, the setting contents set by the situation mode setting unit 30 is not fulfilled. Further, in the case where the manner mode setting unit 21 is selected, the setting contents set by the separate registration operation setting unit 22 is also not fulfilled. Further, a situation mode selecting unit 31 can select an off mode in which any situation mode is not carried out. The mode selecting unit 23 does not fulfill the separate registration operation setting unit 22 in the case where any situation mode is selected by the situation mode selecting unit 31 and fulfills the separate registration operation setting unit 22 in the case where the off mode is selected by the situation mode selecting unit 31.

The situation mode setting unit 30 includes: the situation mode selecting unit 31 which selects any situation mode from a plurality of situation modes; a situation mode adding/deleting unit 32 which can register or delete a new situation mode; a situation mode name changing unit 33 which can change identification information of the situation mode that has already been registered; a situation mode switching unit 34 which can switch the situation mode among a manual mode, an automatic mode and a semiautomatic mode; and a situation operation setting unit 40 which sets the operation contents of the output unit 2 in the situation mode selected by the situation mode selecting unit 31. In the case where the automatic mode is selected in the situation mode switching unit 34, it is possible to switch the situation mode on the basis of the mode instruction signal received by the situation mode information receiving unit 6. In this way, the situation mode switching unit 34 can select whether or not automatically switching settings are utilized. The semiautomatic mode is a mode in which the situation mode is automatically changed only once when the mobile phone apparatus enters an automatically switching area and then the changed situation mode is not automatically changed until the mobile phone apparatus exits from the automatically switching area once by which the situation mode can be changed to a desired mode even in the automatically switching area. The automatic mode is a compulsive mode in which the mode is necessarily changed to the automatic settings in the automatically setting area even though the mode is switched to other settings.

The situation operation setting unit 40 includes: a separate group operation setting unit 41 which specifies group information registered by the group registering unit 12 and sets the operation contents of the output unit 2 to the specified group information; an individual operation setting unit 41 which specifies individual identification information registered by the individual information registering unit 11 and sets the operation contents of the output unit 2 to the specified individual identification information; a situation copying unit 43 which can copy the situation mode information that has already been registered as it is; an unregistered batch operation setting unit 44 which sets groups or individuals that has been unregistered in the situation mode as unregistered information and sets the operation contents of the output unit 2 with respect to the unregistered information; and a separate output operation setting unit 45 which specifies the operation contents of the output unit 2 and sets group information or individual identification information to the operation contents of the output unit 2. It is preferable that each of the separate group operation setting unit 41 and the individual operation setting unit 42 can be set to either operation or nonoperation of the output unit 2. Further, separate output operation setting unit 45 specifies the operation contents of the output unit 2 and sets group information or individual identification information to the operation contents of the output unit 2 along with or in place of the separate group operation setting unit 41 and the individual operation setting unit 42.

The situation mode setting unit 30 has a function of setting the operation contents of the output unit 2 with respect to the groups or individuals registered in the situation mode to nonoperation, and can register only the groups or individuals for each of whom the user does not want to make the mobile phone apparatus operate. Further, in the situation mode selected by the situation mode selecting unit 31, the situation mode setting unit 30 can specify either group specification set by the separate group operation setting unit 41 or individual specification set by the individual operation setting unit 42, and alternatively, the situation mode setting unit 30 can specify both the group specification set by the separate group operation setting unit 41 and the individual specification set by the individual operation setting unit 42. In this way, since it is possible to register a unit that can be registered in the separate situation setting to either plural at a time or an individual, it is possible to carry out the settings easily. Moreover, the mobile phone apparatus has a function that the operation contents of the output unit 2 set by the individual operation setting unit 42 is prioritized over the operation contents of the output unit 2 set by the separate group operation setting unit 41 in the case where the situation mode setting unit 30 specifies both the group specification set by the separate group operation setting unit 41 and the individual specification set by the individual operation setting unit 42, and the individual identification information in the group specification overlaps the individual identification information in the individual specification. In this way, in the case where the person registered in a group is also registered as an individual, the setting of individual registration is prioritized over the setting of group registration. Therefore, it is possible to easily carry out the settings in which the person registered in a group is excluded from the group exceptionally.

The contents of the situation mode set by the situation mode setting unit 30 is stored in the situation mode storage unit 17. Further, the situation mode storage unit 17 stores contents to be displayed on the display unit 4 in accordance with each of the situation modes, and the display unit 4 displays the contents to be displayed in accordance with the situation mode selected by the situation mode selecting unit 31. In this way, by displaying the indication from which the user can understand present situation settings, for example, a setting number or the first letter of a setting name (for example, "D" in the case of on duty) on a liquid crystal screen that is the display unit 4, it is possible for the user to understand the present settings.

The situation operation setting unit 40 has a function of capable of setting the operation contents of the output unit 2 by situation mode, and also has a function of capable of setting operation contents of the output unit 2 different from the operation contents set in the separate registration operation setting unit 22 by situation mode.

The situation mode setting unit 30 has a function of capable of registering a new situation mode by means of the situation copying unit 43 when the situation mode adding/deleting unit 32 adds the new situation mode, and of capable of changing the settings of the situation mode information copied by the situation copying unit 43 by means of the separate group operation setting unit 41 and the individual operation setting unit 42.

The storage unit 10 includes a switching content output unit 18 which outputs an output signal to the output unit 2, and a key operation judging unit 19 which judges the operation of the specific keys constituting the input unit 3 or the operation of the dedicated key constituting the input unit 3, and outputs a judged result to the mode selecting unit 23.

The switching content output unit 18 informs the user that the settings is automatically switched by making the output unit 2 output any one of sound, vibration, light and indication in the case where the situation mode is switched on the basis of a mode instruction signal received by the situation mode information receiving unit 6 or in the case where the set situation mode is fulfilled at the date and time that has been set in advance on the basis of the schedule setting unit 13.

The key operation judging unit 19 judges the operation of the specific keys constituting the input unit 3 and selects a situation mode on the basis of the judging result. Alternatively, the key operation judging unit 19 judges the operation of the specific keys constituting the input unit 3 and the operation of the dedicated key constituting the input unit 3, and selects a situation mode on the basis of the judging result.

Next, the process flow on setting a situation mode in the mobile phone apparatus of the present example will be described on the basis of the operation screens of the display unit 4.

Figure 2:
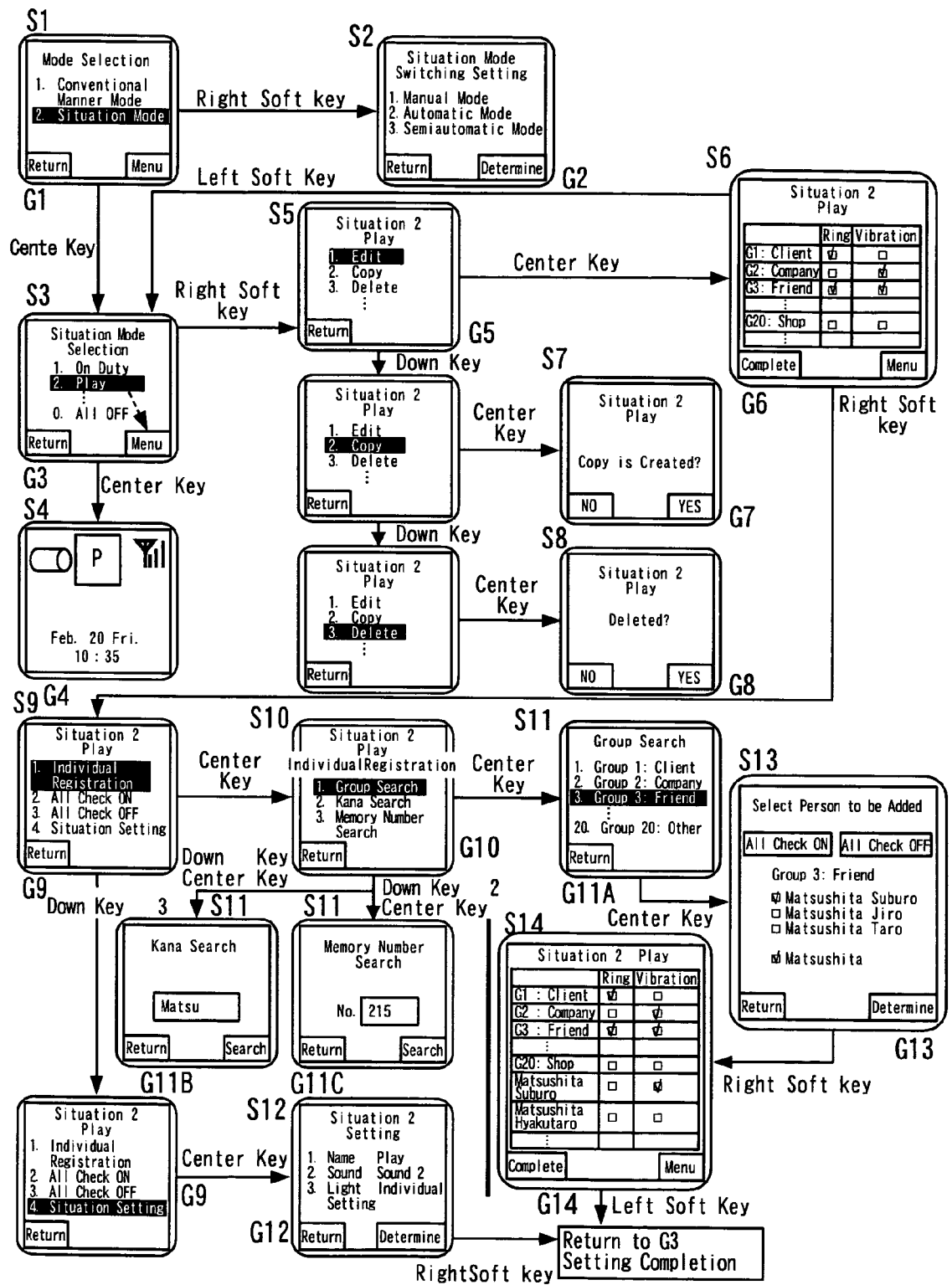
FIG. 2 is a transition diagram of a display when a situation mode of the mobile phone apparatus of the one example of the present invention is set.

FIG. 2 is a transition diagram of a display when a situation mode of the mobile phone apparatus of the one example of the present invention is set.

First, an explanation will be given for the terms used in the following.

Soft keys are keys special to a mobile phone apparatus, and are displayed in the lower right and left portions of a display screen depending on the situation. Further, the soft keys are keys that can endow functions corresponding to various commands with the mobile phone apparatus. A button displayed in the lower left portion of the display screen is referred to as a left soft key, while a button displayed in the lower right portion of the display screen is referred to as a right soft key.

A center key is positioned in the center of a cross-shaped key (used for a movement key and a navigation key) of the mobile phone apparatus, and is a key that is often used for selection, determination or the like.

Further, menus on the display screen in FIG. 2 to each of which a symbol is applied are commands that can be selected by operation of the user. Each of the menus can be selected by selecting the menu by means of the cross-shaped key to push (press) the center key or pushing (pressing) numeral keys corresponding to the number of the menu.

Moreover, letters surrounded with a frame displayed in the lower right and left portions of the display screen mean menus that can be operated by means of the soft keys. In this regard, this operation may be achieved by means of other key operation.

A situation setting screen G1 is called up from a normal standby screen by means of a menu operation as an initial operation (Step 1). At Step 1, either a conventional manner mode or a situation mode is selected. A state in which "2. Situation Mode" is selected is shown in FIG. 2. At Step 1, by pushing the right soft key, a mode switching screen G2 is displayed (Step 2). On the other hand, at Step 1, by pushing the center key, a situation mode selecting screen G3 is displayed (Step 3).

In the mode switching screen G2 displayed at Step 2, any one of a manual mode, an automatic mode and a semiautomatic mode can be selected.

In the situation mode selecting screen G3 at Step 3, a state in which "2. Play" is selected is shown. By pushing the center key while a cursor is positioned on "2. Play", a play mode is selected, by which incoming call settings is set to a play situation, and a mark by which a selected situation can be understood (for example, indication of "P") is displayed on the standby screen G4 (Step 4). By pushing the right soft key while the cursor is positioned on "2. Play" on the situation mode selecting screen G3 at Step 3, a menu screen G5 is displayed (step 5).

By selecting "1. Edit" on the menu screen G5 at Step 5, a display screen G6 for editing the situation mode 2 is displayed (Step 6). At Step 6, by applying a check mark in a box of the function that the user wants to operate in a group to be operated, it is possible to carry out the operation settings. The settings in which all the groups that has already been registered are displayed from the beginning is displayed on the display screen G6. There are a plurality of output functions such as "ringing" and "vibration", and the functions that is not shown on the display screen can be displayed by scrolling in a lateral direction. Not only groups but also individuals can be added in a list. The operation is shifted to Step 9 by pushing the right soft key, and the mobile phone apparatus becomes a state in which individuals can be additionally registered by opening a menu screen G9.

By selecting "2. Copy" on the menu screen G5 at Step 5, a copy confirmation screen G7 of the situation 2 is displayed (Step 7).

By selecting "YES" on the copy confirmation screen G7 at Step 7, a copy destination can be specified after carrying out a copy operation. After the copy operation at Step 7, an item of "Copy Play" is added to the situation mode selecting screen G3.

By selecting "3. Delete" on the menu screen G5 at Step 5, a deletion confirmation screen G8 of the situation 2 is displayed (Step 8). After a deletion operation at Step 8, an item of "2. Play" on the situation mode selecting screen G3 is displayed at "2. No Setting".

On the menu screen G9 at Step 9, any one of "1. Individual Registration", "2. All Checkbox ON", "3. All Checkbox OFF" and "4. Situation Setting" can be selected.

In the case where "1. Individual Registration" is selected on the menu screen G9 at step 9, searching method selecting screens G10, G11A for selecting individuals are displayed in turn, and it is possible to carry out an individual registration search similar to a general telephone dictionary search (Step 10 and Step 11). In this regard, in the case where "2. Kana Search" is selected on the searching method selecting screen G10 at Step 10, a kana searching screen G11B is displayed. Further, in the case where "3. Memory Number Search" is selected, a memory number searching screen G11C is displayed, by which it is possible to carry out a memory number search (Step 11).

In the case where "4. Situation Setting" is selected on the menu screen G9 at Step 9, a setting screen G12 is displayed, by which it is possible to carry out the settings for each of the situations (Step 12). At Step 12, it is possible to carry out the settings for each of the situations different from those for individuals and groups such as ringtone, light, in particular, a setting name.

Check boxes are displayed on a screen G13 for selecting individuals so that a plurality of individuals can be set by the same screen, and the presence or absence of a vibration setting can be set using each of the check boxes (Step 13). At Step 13, it is thoughtful that the operation is convenient when selecting the plurality of individuals by means of a all check ON button or a all check OFF button.

When the individual newly selected is added at Step 13, as shown on a operation list screen G14, it is possible to carry out the confirmation of the addition by displaying the operation list of the situation 2 "Play" after adding the individual (Step 14).

Figure 3:
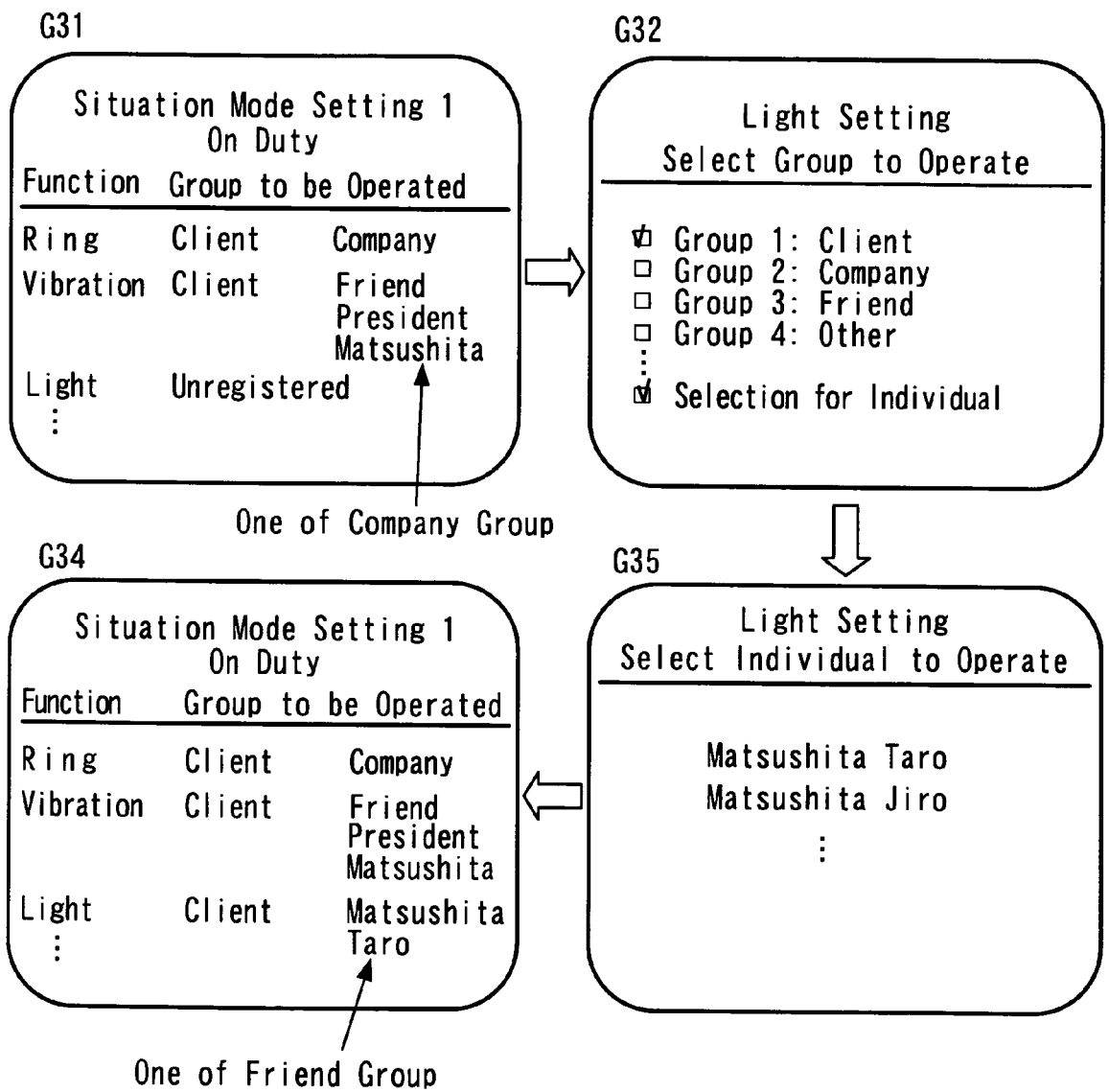
FIG. 3 is a transition diagram of a display which shows an example of registration when a situation mode of the mobile phone apparatus of the one example of the present invention is set.

FIG. 3 is a transition diagram of a display which shows an example of registration when a situation mode of the mobile phone apparatus of the one example of the present invention is set.

The case where "on duty" has been already registered as a situation mode is shown on a situation mode setting 1 screen G31. As shown on the situation mode setting 1 screen G31, "ringtone", "vibration", "light", and the like are set as incoming call functions, and "client" and "company" are registered in "ringtone" as a group to be operated. Further, "client", "friend" and "President Matsushita" are registered in "vibration". In this case, no one is registered in "light".

In the case of carrying out "light" settings from this state, a group selecting screen G32 that the user wants to operate in the "light" settings is displayed, and the check box for a setting target group is checked. A state in which "Group 1: Client" and "Selection for Individuals" are selected as the setting target is shown on the group selecting screen G32 that the user wants to operate in the light settings.

In the case where "Selection for Individuals" settings are carried out from this state, an individual selecting screen G33 that the user wants to operate in the light settings is displayed, and the corresponding individual is selected. In this case, "Matsushita Taro" is selected.

By carrying out the "light" settings as described above, "client" and "Matsushita Taro" are additionally registered in "light" on the situation mode setting 1 screen G34.

Figure 4:
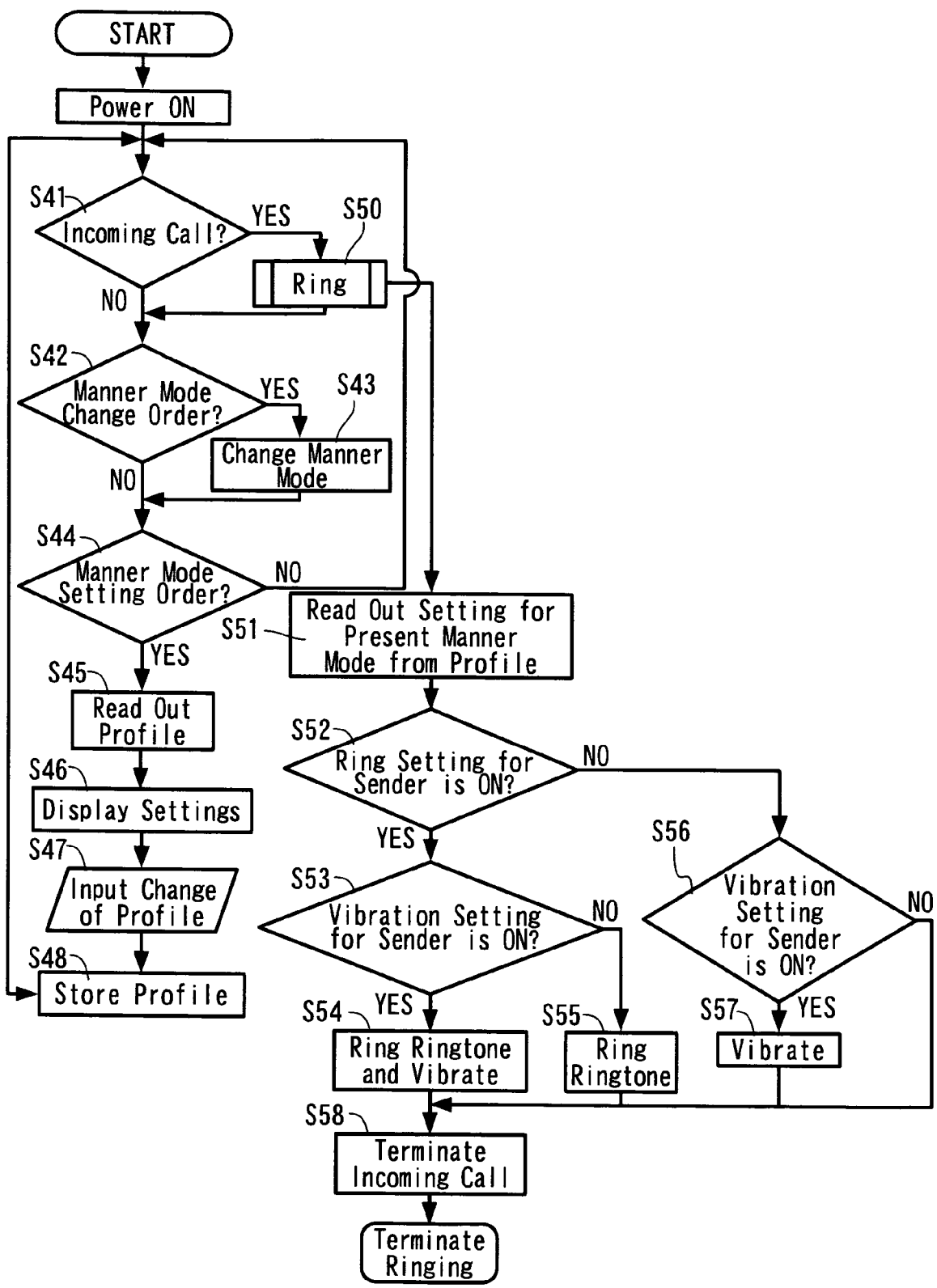
FIG. 4 is a flowchart which shows operation processing of the mobile phone apparatus of the one example of the present invention.

FIG. 4 is a flowchart which shows operation processing of the mobile phone apparatus of the one example of the present invention.

When the power of the mobile phone apparatus is turned ON, a communication state is available. First, the state of the presence or absence of an incoming call is determined (Step 41), and a change of a situation mode is available while an incoming call is nothing at Step 41. At Step 42, presence or absence of a change order of the situation mode is determined. When there is a change order of the situation mode, the situation mode is changed (Step 43), and the operation is returned to an incoming call standby state. At Step 42, in the case where there is no change order of the situation mode, presence or absence of a situation mode setting order is determined (Step 44). When there is no situation mode setting order at Step 44, the operation is returned to the incoming call standby state.

In the case where there is a situation mode setting order at Step 44, a profile is read out from the situation mode storage unit (Step 45), the stored profile is displayed (Step 46). At Step 46, the contents of the profile are changed on the basis of the contents of the displayed profile (Step 47). When the contents of the profile to be changed are inputted at Step 47, the contents of the changed profile are stored (Step 48), and the operation is returned to the incoming call standby state.

When an incoming call is determined at Step 41, a ringing operation is carried out (Step 50).

In the case of carrying out the ringing operation, a profile with respect to a sender is first read out from the situation mode storage unit (Step 51). Then, it is determined whether the ringing settings for the sender are set to ON or not from the profile read out (Step 52).

At Step 52, in the case where the ringing settings for the sender are set to ON, it is determined whether the vibration settings for the sender is set to ON or not (Step 53). In the case where the vibration settings for the sender are set to ON at Step 53, the mobile phone apparatus rings ringtones and vibrates itself (Step 54). In the case where the vibration settings for the sender are set to OFF at Step 53, the mobile phone apparatus rings ringtone (Step 55).

On the other hand, at Step 52, in the case where the ringing settings for the sender are set to OFF, it is determined whether the vibration settings for the sender is set to ON or not (Step 56). In the case where the vibration settings for the sender are set to ON at Step 56, the mobile phone apparatus vibrates itself (Step 57). In the case where the vibration settings for the sender are set to OFF at Step 56, the mobile phone apparatus neither rings ringtone nor vibrates itself.

The incoming call is terminated (Step 58) and the ringing operation is then terminated after ringing the ringtone and vibrating itself for a predetermined time period at Step 54, after ringing the ringtone for a predetermined time period at Step 55, after vibrating itself for a predetermined time period at Step 57, or after a predetermined time period lapses in the case where the vibration settings for the sender are set to OFF at Step 56.

As described above, according to the present example, it is possible to register the settings for a ringing operation when receiving a telephone call depending on the situation, and this makes it possible to carry out an incoming call operation for each of group information and/or individual information in response to usage conditions of the user such as "on duty" and "play (game)".

Further, according to the present example, the situation mode setting unit 30 includes: a situation mode adding/deleting unit 32 which can register or delete a new situation mode; and a situation mode name changing unit 33 which can change identification information of the situation mode that has already been registered. Therefore, it is possible to add a new situation mode and to change the mane of a situation (the name of settings) arbitrarily.

Moreover, according to the present example, the operation setting unit 20 includes a mode selecting unit 23 which does not fulfill the separate registration operation setting unit 22 in the case where any situation mode is selected by the situation mode selecting unit 31 and fulfills the separate registration operation setting unit 22 in the case where the off mode is selected by the situation mode selecting unit 31. Further, the situation operation setting unit 40 has a function of capable of setting operation contents of the output unit 2 different from the operation contents set in the separate registration operation setting unit 22 by situation mode. Therefore, it is possible to set ringtones depending on the situation in addition to the ringtones (melodies) set for each of the individuals and the groups. In the case where the operation contents of the output unit 2 are not set to any situation mode, it is possible to ring the ringtones set for each of the individuals and the groups, for example.

According to the present example, the situation operation setting unit 40 has a function of capable of setting the operation contents of the output unit 2 by situation mode. Therefore, it is possible to register a plurality of operation settings when receiving a telephone call in response to each of the situations.

Furthermore, according to the present example, the situation mode setting unit 30 has a function of capable of registering a new situation mode by means of the situation copying unit 43 when the situation mode adding/deleting unit 32 adds the new situation mode, and of capable of changing the settings of the situation mode information copied by the situation copying unit 43 by means of the separate group operation setting unit 41 and the individual operation setting unit 42. Therefore, since only portions to be changed may be set when registering a plurality of situations whose setting contents are particularly common, it is possible to save setting time and/or trouble for settings.

Further, according to the present example, each of the separate group operation setting unit 41 and the individual operation setting unit 42 is set to either operation or non-operation of the output unit 2. Therefore, it is possible to carry out the settings easily.

Moreover, according to the present example, the situation operation setting unit 40 includes an unregistered batch operation setting unit 44 which sets groups or individuals that has been unregistered in the situation mode as unregistered information and sets the operation contents of the output unit 2 with respect to the unregistered information. Therefore, it is possible to deal with the groups or individuals unregistered in the separate situation setting as other group in a lump sum.

Furthermore, according to the present example, the situation operation setting unit 40 includes a separate output operation setting unit 45 which specifies the operation contents of the output unit 2 and sets group information or individual identification information to the operation contents of the output unit 2. Therefore, it is possible to register only groups or individuals for each of whom the user wants to make the mobile phone apparatus operate with respect to each of the functions.

Further, according to the present example, the situation mode setting unit 30 sets the operation contents of the output unit 2 with respect to the groups or individuals registered in the situation mode to nonoperation. Therefore, it is possible to register only the groups or individuals for each of whom the user does not want to make the mobile phone apparatus operate with respect to each of the functions.

Moreover, according to the present example, the situation mode setting unit 30 can specify either group specification set by the separate group operation setting unit 41 or individual specification set by the individual operation setting unit 42, and alternatively, the situation mode setting unit 30 can specify both the group specification set by the separate group operation setting unit 41 and the individual specification set by the individual operation setting unit 42. Therefore, it is possible to set a unit that can be registered in the separate situation setting to either plural at a time or an individual, and this makes it possible to carry out the settings easily.

Furthermore, according to the present example, in the case where the individual identification information in the group specification overlaps the individual identification information in the individual specification, then the operation contents of the output unit 2 set by the individual operation setting unit 42 is prioritized over the operation contents of the output unit 2 set by the separate group operation setting unit 41. Therefore, in the case where the person registered in a group is also registered as an individual, it is possible to easily carry out the settings in which the person registered in a group is excluded from the group exceptionally.

Further, according to the present example, it is possible to use either a conventional manner mode or the situation mode selectively.

Moreover, according to the present example, the situation mode is selected by means of an operation of the specific keys constituting the input unit 3. Therefore, it is possible to select the situation by means of a manual operation at arbitrary timing.

Furthermore, according to the present example, the situation mode is selected by means of an operation of the specific keys for selecting the situation mode and an operation of the dedicated key constituting the input unit 3. Therefore, it is possible to select the situation by operating the dedicated key for selecting the situation mode as well as a conventional method for setting the manner mode.

Further, according to the present example, a situation mode switching unit 34 switches the situation mode of the mobile phone apparatus on the basis of the mode instruction signal received by the situation mode information receiving unit 6. Therefore, it is possible to change the settings in response to the situation automatically using a short-range radio communication.

Moreover, according to the present example, it is possible to carry out a configuration change automatically at the day and time that has been set in advance in conjunction with a schedule book, for example, by means of the schedule setting unit 13.

Furthermore, according to the present example, since the mobile phone apparatus further includes a switching content output unit 18, it is possible to inform the user that the setting is switched automatically using a specific sound or vibration.

Further, according to the present example, by displaying the indication from which the user can understand present situation settings on the display unit 4 in accordance with the situation mode selected by the situation mode selecting unit 31, it is possible for the user to understand the present settings.

INDUSTRIAL APPLICABILITY

As described above, the present invention can be applied not only to a mobile phone apparatus that can inform of an incoming call, but also to other receiving apparatuses.

What is claimed is:

1. A mobile phone apparatus comprising:
a communication unit which carries out transmission and receipt of data via a communication network;
an output unit for outputting at least one of sound, vibration, light and indication;
a storage unit which stores apparatus identification data and various setting information, the storage unit including: an individual information registering unit which registers apparatus identification information on a plurality of other communication apparatuses and individual identification information of communication apparatuses;
a group registering unit which registers some of the plurality of other communication apparatuses registered in the individual information registering unit as a group; and an operation setting unit which sets operation contents of the output unit;
an input unit for inputting apparatus identification data and/or various setting information; and
a display unit for displaying information on transmission and receipt of data and/or various setting information,
wherein the output unit outputs the operation contents set by the operation setting unit when an incoming call signal is received by the communication unit,
wherein the storage unit further includes a situation mode setting unit which sets the operation contents of the output unit in response to usage conditions of the user of the mobile phone apparatus, and the situation mode setting unit includes a situation mode selecting unit which selects any situation mode from a plurality of situation modes and a situation operation setting unit which sets the operation contents of the output unit in the situation mode selected by the situation mode selecting unit, and
wherein the situation operation setting unit includes a separate group operation setting unit which specifies group information registered by the group registering unit and sets the operation contents of the output unit to the specified group information, and an individual operation setting unit which specifies individual identification information registered by the individual information registering unit and sets the operation contents of the output unit to the specified individual identification information.

2. The mobile phone apparatus as claimed in claim 1, wherein the situation mode setting unit comprises:
a situation mode adding/deleting unit which can register or delete a new situation mode; and
a situation mode name changing unit which can change identification information of the situation mode that has already been registered.

3. The mobile phone apparatus as claimed in claim 2, wherein the situation operation set ting unit includes a situation copying unit which can copy the situation mode information that has already been registered as it is, and
wherein the situation mode setting unit has a function of capable of registering a new situation mode by means of the situation copying unit when the situation mode adding/deleting unit adds the new situation mode, and of capable of changing the settings of the situation mode information copied by the situation copying unit by means of the separate group operation setting unit and the individual operation setting unit.

4. The mobile phone apparatus as claimed in claim 1, wherein the situation mode selecting unit can select an off mode in which any situation mode is not carried out,
wherein the operation setting unit comprises: a separate registration operation setting unit which sets the operation contents of the output unit with respect to each of the registered individual identification information or the registered group information, and a mode selecting unit which does not fulfill the separate registration operation setting unit in the case where any situation mode is selected by the situation mode selecting unit and fulfills the separate registration operation setting unit in the case where the off mode is selected by the situation mode selecting unit, and
wherein the situation operation setting unit has a function of capable of setting operation contents of the output unit different from the operation contents set in the separate registration operation setting unit by situation mode.

5. The mobile phone apparatus as claimed in claim 1, wherein the situation operation setting unit has a function of capable of setting the operation contents of the output unit by situation mode.

6. The mobile phone apparatus as claimed in claim 1, wherein each of the separate group operation setting unit and the individual operation setting unit is set to either operation or nonoperation of the output unit.

7. The mobile phone apparatus as claimed in claim 1, wherein the situation operation setting unit includes an unregistered batch operation setting unit which sets groups or individuals that has been unregistered in the situation mode as unregistered information and sets the operation contents of the output unit with respect to the unregistered information.

8. The mobile phone apparatus as claimed in claim 1, wherein the situation operation setting unit includes a separate output operation setting unit which specifies the operation contents of the output unit and sets group information or individual identification information to the operation contents of the output unit in place of the separate group operation setting unit and the individual operation setting unit.

9. The mobile phone apparatus as claimed in claim 1, wherein the situation mode setting unit sets the operation contents of the output unit with respect to the groups or individuals registered in the situation mode to nonoperation, 10. The mobile phone apparatus as claimed in claim 1, wherein in the situation mode selected by the situation mode selecting unit, the situation mode setting unit can specify either group specification set by the separate group operation setting unit or individual specification set by the individual operation setting unit, and alternatively, the situation mode setting unit can specify both the group specification set by the separate group operation setting unit and the individual specification set by the individual operation setting unit.

11. The mobile phone apparatus as claimed in claim 10, wherein, in the case where the situation mode setting unit specifies both the group specification set by the separate group operation setting unit and the individual specification set by the individual operation setting unit, and the individual identification information in the group specification overlaps the individual identification information in the individual specification, then the operation contents of the output unit set by the individual operation setting unit is prioritized over the operation contents of the output unit set by the separate group operation setting unit.

12. The mobile phone apparatus as claimed in claim 1, wherein the operation setting unit includes a manner mode setting unit which can set specific operation contents of the output unit to nonoperation, and the storage unit includes a mode selecting unit which selects either the situation mode setting unit or the manner mode setting unit.

13. The mobile phone apparatus as claimed in claim 1, wherein the input unit has a plurality of keys including specific keys, and the situation mode is selected by means of an operation of the specific keys.

14. The mobile phone apparatus as claimed in claim 1, wherein the input unit has a plurality of keys including specific keys and a dedicated key for selecting the situation mode, and the situation mode is selected by means of an operation of the specific keys and an operation of the dedicated key.

15. The mobile phone apparatus as claimed in claim 1, further comprising:
a situation mode information receiving unit for receiving a mode instruction signal from an outside situation mode sending unit wherein the situation mode setting unit includes a situation mode switching unit which switches the situation mode of the mobile phone apparatus on the basis of the mode instruction signal received by the situation mode information receiving unit.

16. The mobile phone apparatus as claimed in claim 15, further comprising a switching con tent output unit for output ting at least one of sound, vibration, light and indication when the situation mode is switched.

17. The mobile phone apparatus as claimed in claim 1, wherein the storage unit includes a schedule setting unit which fulfills the set situation mode at the date and time that has been set in advance.

18. The mobile phone apparatus as claimed in claim 17, further comprising a switching con tent output unit for output ting at least one of sound, vibration, light and indication when the situation mode is switched.

19. The mobile phone apparatus as claimed in claim 1, wherein the storage unit stores contents to be displayed on the display unit in accordance with each of the situation modes, and the display unit displays the contents to be displayed in accordance with the situation mode selected by the situation mode selecting unit.

* * * * *